United States Patent
MacDuff

[15] 3,653,209
[45] Apr. 4, 1972

[54] VEHICLE HYDRAULIC SYSTEM

[72] Inventor: Stanley I. MacDuff, Laverniere, Quebec, Canada

[73] Assignee: The Bendix Corporation

[22] Filed: Aug. 31, 1970

[21] Appl. No.: 68,093

[52] U.S. Cl. ...........................................................60/52 S
[51] Int. Cl. ........................................................F15b 15/18
[58] Field of Search ...........................................60/52 S, 52 B

[56] References Cited

UNITED STATES PATENTS

| | | | |
|---|---|---|---|
| 2,791,287 | 5/1957 | Stolte | 60/52 S X |
| 2,954,671 | 10/1960 | Kress | 60/52 S X |
| 3,088,284 | 5/1963 | Aaron | 60/52 S X |
| 3,280,557 | 10/1966 | Sattavara | 60/52 S X |

Primary Examiner—Edgar W. Geoghegan
Attorney—William N. Antonis and Plante, Hartz, Smith and Thompson

[57] ABSTRACT

A hydraulic system for a motor vehicle having an open center type hydraulic power brake booster, an open center type hydraulic power steering gear, and an adaptive braking system using hydraulically powered brake line pressure modulators. The system includes a control valve receiving flow from an engine driven pump and a drive shaft driven pump delivering appropriate quantities of fluid to the brake booster and steering gear. They also deliver fluid at the correct pressure to the brake line pressure modulators upon receiving a pressure signal from the brake booster. Check valves are provided in the pump discharge lines to prevent backflow through a pump in the event of failure of the pump or its drive mechanism. The system control valve also includes pressure relief valves to limit pressures in the several systems to appropriate levels.

10 Claims, 1 Drawing Figure

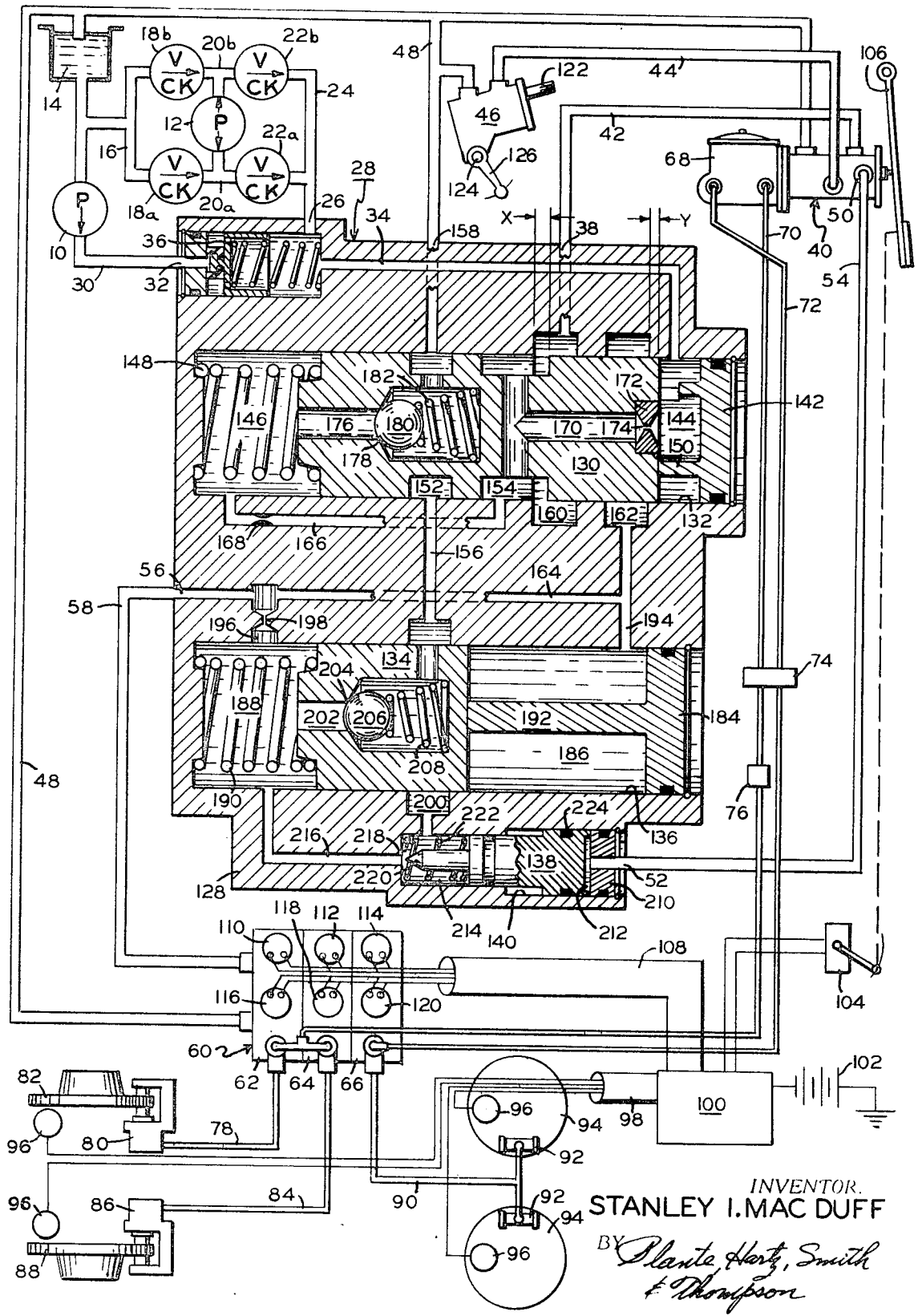

1

VEHICLE HYDRAULIC SYSTEM

BACKGROUND OF THE INVENTION

This invention relates to hydraulic systems for motor vehicles and more particularly to hydraulic systems for motor vehicles equipped with an adaptive braking system such as is described generally in U.S. Pat. No. 3,494,671, having a common assignee with this application. More specifically, it relates to vehicles equipped with open center hydraulic braking systems, such as are described in U.S. application Ser. No. 794,472 now U.S. Pat. No. 3,532,027 issued Oct. 6, 1970, filed on Jan. 15, 1969, and which have hydraulically powered brake line pressure modulators for the adaptive braking system such as are illustrated in U.S. application Ser. No. 831,949, filed on June 10, 1969, both of which applications have a common assignee with this application. It would be usual for a vehicle having systems such as those just referred to, also to have a conventional open center hydraulic power steering gear.

A problem common to vehicles equipped with hydraulic booster devices, such as are referred to above, arises when the fluid supply fails and causes the systems to revert to a manual mode of operation which results in a substantial increase in the operating forces. This problem becomes more acute when a completely automatic system, such as the adaptive braking system referred to above, is incorporated into the vehicle. A simple failure, such as that produced by stalling the engine, would cause a complete failure of the adaptive braking system. The solution proposed in the application referred to above is to provide pressurized fluid stored in an accumulator. It is well known in the hydraulic art that accumulators are very expensive, and that they have certain requirements for periodic maintenance which, if not carried out, may create problems of system reliability.

SUMMARY OF THE INVENTION

Consequently, it is an object of this invention to provide a hydraulic system which is reliable in operation.

It is a further object to provide a system which does not require the storage of pressurized fluid.

Another object is to provide a system which does not require specific periodic maintenance operations such as the inspection and addition of gases to maintain preload pressure in an accumulator.

Still another object is to provide a system which is protected against failure due to engine stalls.

It is proposed to carry out these objects by providing a system having two pumps, one of which may be the conventional engine driven pump and the other of which may be installed in, or be connected to, the drive line of the vehicle so that it is operated any time the vehicle is in motion. Alternatively, the second pump may be an electrically driven pump. A control valve is provided which combines flow from both pumps. The control valve is provided with check valves to prevent backflow into a failed or inoperative pump. The control valve divides the pump discharge into a controlled stream and an uncontrolled stream. The controlled stream is in the range of 1.5 to 2.0 gallons per minute (gpm) and is delivered to the brake booster and the steering gear for their normal operation. The flow control portion of the control valve also is equipped with pressure relief means to limit the maximum pressure available to the booster systems. The uncontrolled stream is normally directed back to the system reservoir, but, when the brakes are applied, a pressure signal is transmitted from the brake booster to the system control valve. This signal causes a pressure control means to restrict the flow of the uncontrolled stream to the reservoir, thereby raising the pressure of the stream and making it available to the adaptive braking pressure modulators in the event that the brake application or road surface is of such character as to cause the adaptive braking system to function.

BRIEF DESCRIPTION OF THE DRAWINGS

The sole FIGURE of the drawing is a diagrammatic representation of a vehicle hydraulic system made pursuant to the teachings of my present invention with the control valve used therein illustrated in cross section.

DETAILED DESCRIPTION OF THE INVENTION

Referring now to the drawing, the system of the FIGURE is operated with fluid flow and pressure from a pump 10 which is belt driven from the vehicle engine (not shown), and a pump 12 which may be driven by a connection to the vehicle drive shaft (not shown) or electrically driven. Fluid is drawn from a reservoir 14 which may be a part of the engine driven pump assembly. This reservoir also supplies fluid through a conduit 16 to a pair of inlet check valves 18a and 18b and thence through conduits 20a and 20b to the ports of the reversible drive shaft driven pump 12. The conduits 20a and 20b also are connected to outlet check valves 22a and 22b, respectively, leading to a conduit 24, by means of which the fluid from the drive shaft driven pump 12 is conducted to a port 26 of a system control valve 28. Fluid from the engine driven pump 10 is conducted to the control valve 28 through another conduit 30 leading to a port 32. The ports 26 and 32 both lead to an internal passage 34 in the control valve 28. A check valve 36 is interposed between them to prevent flow from the port 26 to the port 32, i.e., from the drive shaft driven pump 12 to the engine driven pump 10. It should be noted that the pair of check valves 22a and 22b similarly prevent backflow from the engine driven pump 10 to the drive shaft driven pump 12. It should also be noted that the two pairs of check valves 18a and 18b and 22a and 22b permit the pump 12 to run in either direction, as required by the direction in which the vehicle is moving, without corresponding change in the direction of flow in the conduits 16 and 24.

The fluid delivered to the control valve 28 from the pumps 10 and 12 is divided into a controlled stream and an uncontrolled stream, as will be described later. The controlled stream leaves the control valve 28 through a port 38 and is conducted to a hydraulic brake booster 40 by a conduit 42. After passing through the open center valving of the booster 40, the controlled stream is conducted by a conduit 44 to a conventional hydraulic power steering gear 46. After passing through the open center valving of the power steering gear 46, the controlled stream of fluid is returned to the reservoir 14 by the return conduit 48. The brake booster 40 has a return port which is connected to the return conduit 48, and it also has a signal port 50 connected to a port 52 of the control valve 28 by a conduit 54. The signal port 50 communicates with the operating cylinder of the booster and transmits the pressure in that cylinder to the control valve 28.

The uncontrolled stream of fluid is normally discharged to the return conduit 48, but, on occasion, as will be described later, it may be directed under pressure through a port 56 and a conduit 58 to a brake line pressure modulator 60. Fluid used in the modulator 60 is also discharged to the reservoir 14 through the return conduit 48. The modulator 60 is shown as being made up of three modular elements 62, 64 and 66 as described in the above-mentioned patent application Ser. No. 831,949.

The brake booster operates a conventional split type master cylinder 68 which discharges brake fluid into a front brake line 70 and a rear brake line 72. The two brake lines 70 and 72 pass through a conventional split system failure warning switch 74 and, if the vehicle front brakes are disc brakes, the front brake line 70 also passes through a conventional metering valve 76. The front brake line 70 divides and enters the pressure modulator elements 62 and 64. A line 78 leaves the modulator element 62 and enters the wheel cylinder 80 of the right front disc brake 82, and a line 84 leaves the modulator element 64 and enters the wheel cylinder 86 of the left front disc brake 88. The rear brake line 72 enters the pressure modulator element 66, and a line 90 leaves the element 66 and enters the wheel cylinders 92 of the two rear brakes 94.

Each of the vehicle wheels is provided with a wheel speed sensor 96 which is adapted to transmit an electrical signal through electrical conductors 98 to an amplifier-computer unit 100. The amplifier 100 receives electrical energy from a conventional vehicle battery 102, and usually is provided with a switch 104 operated by a conventional brake pedal 106 which also is connected to operate the brake booster 40. The amplifier 100 is connected, by means of a multi-conductor wiring harness 108, to three inlet solenoid valves 110, 112, and 114, and three outlet solenoid valves 116, 118, and 120 forming parts of the brake pressure modulator elements 62, 64 and 66, respectively.

The power steering gear 46 is provided with an input shaft 122 connected to a conventional steering wheel (not shown). The steering gear 46 also is provided with an output shaft 124 upon which a pitman arm 126 is mounted. The pitman arm 126 is connected to a conventional steering linkage (not shown).

Returning now to the control valve 28, it comprises a body casting 128 of iron or other suitable material. In addition to the previously described check valve 36, the control valve 28 includes the following: a flow control valve plunger 130 slidable in a bore 132 formed in the casting 128; a pressure control valve plunger 134 slidable in a bore 136 formed in the casting 128; and a pilot valve element 138 slidable in a bore 140 formed in the casting 128. In further description of the control valve 28, the terms left and right will be used and will refer to parts as seen in the figure.

The flow control valve bore 132 is closed at the right end by a plug 142 and at the left end by the casting 128 therebetween, forming chambers 144 and 146 at each end of the plunger 130. The chamber 144 at the right end communicates with the passage 34. The chamber 146 at the left end contains a spring 148 which urges the plunger towards the right into contact with a stop formed by a projection 150 of the plug 142. The flow control valve plunger 130 is formed with two annular grooves 152 and 154. A passage 156, leading from a port 158 connected to the return conduit 48, intersects the bore 132 in the area of the leftward annular groove 152. The bore 132 is formed with an annular groove 160 which overlaps the right hand edge of the rightward annular groove 154 of the valve plunger 130 by an amount labeled "$x$" in the figure. The annular groove 160 communicates with the port 38. The bore 132 also is formed with another annular groove 162, positioned to the right of the annular groove 160, which terminates short of the right hand end of the flow control plunger 130 by an amount labeled "$y$" which is less than $x$ by a predetermined amount. The annular groove 162 is connected to the port 56 by a passages 194 and 164 formed in the casting 128. The chamber 146 is connected to the annular groove 154 in the plunger 130 by a passage 166 formed in the casting 128. This passage 166 is provided with a restrictive orifice 168. A passage 170 formed in the plunger 130 leads from the chamber 144 to the annular groove 154. A bushing 172 containing a flow measuring orifice 174 is pressed into an enlarged portion of the passage 170. A passage 176 also formed in the plunger 130 leads from the chamber 146 to the annular groove 152. The passage 176 is provided with a valve seat 178 upon which a relief valve ball 180 is seated. A spring 182 holds the ball 180 onto the seat 178 with a predetermined load.

The pressure control valve bore 136 is closed at the right end by a plug 184 and at the left end by the casting, forming chambers 186 and 188 on each end of the plunger 134. The chamber 188 at the left end contains a spring 190 which urges the plunger 134 towards the right into contact with a stop formed by a projection 192 of the plug 184. The chamber 186 is connected directly to the passage 164 by a branch passage 194, and the chamber 188 is connected to the passage 164 by a branch passage 196 containing a restrictive orifice 198. The bore 136 is formed intermediate the ends of the plunger 134 with an annular groove 200 which is intersected by the passage 156. The right edge of the annular groove 200 is positioned close to the right end of the plunger 134 so that the edge of annular groove 200 and the end of the plunger form cooperating fixed and movable valve elements, respectively. A passage 202 formed in the plunger 134 leads from the chamber 188 to the annular groove 200. The passage 202 is provided with a valve seat 204 upon which a relief valve ball 206 is seated. A spring 208 holds the ball 206 onto the seat 204 with a predetermined load.

The pilot valve bore 140 is closed at the right end by a plug 210 and at the left end by the casting 128, forming chambers 212 and 214 at each end of the plunger 138. The plug 210 is formed with the port 52 which receives the conduit 54 so that pressure from the brake booster port 50 is communicated to the chamber 212. The chamber 214 to the left of the plunger 138 is intersected by the passage 156 leading to the port 158 and thence to the return conduits 48. Another passage 216 from the pressure control valve chamber 188 enters the chamber 214 concentrically with the valve plunger 138 forming a valve seat 218 with the end wall of the chamber 214. The plunger 138 is provided with a projection having a conical end constituting a poppet valve 200 adapted to engage the seat 218 and close the passage 216. A spring 222 having a predetermined load holds the plunger 138 to the right in contact with the plug 210. The plunger 138 is provided with an O-ring seal 224 adapted to prevent leakage from the chamber 212 to the chamber 214. It should be noted that the area of the plunger 138 is several times the area of the valve seat 218, whereby a relatively small pressure in the chamber 212 can hold the poppet valve 220 onto the seat 218 against a much greater pressure in the passage 216.

OPERATION OF THE INVENTION

When the vehicle engine is started, the pump 10 delivers fluid through the conduit 30 and the port 32 to the control valve 28. The fluid flows past the check valve 36, through the passage 34, into the chamber 144, through the flow measuring orifice 174, through the passage 170, and through the overlapping annular grooves 154 and 160 to the port 38. If the vehicle is put in motion, the pump 12 also delivers fluid to the control valve 28 through its outlet check valve 22a or 22b, the conduit 24 and the port 26. When the flow velocity in the flow measuring orifice 174 exceeds a value which will produce a total flow of the correct amount for what has been referred to previously as the controlled stream, e.g., 1.5 to 2.0 gpm., the pressure drop through the orifice will be great enough so that the force exerted on the plunger 130 by the fluid upstream of the orifice, in the chamber 144, will exceed the force exerted on the plunger 130 by fluid downstream of the orifice, in the chamber 146, by an amount equal to the preload of the spring 148, and the plunger 130 will move leftward. When the plunger has moved a distance equal to $y$, the right end of the plunger, acting as a movable valve element, will uncover the right edge of the annular groove 162, acting as a fixed valve element, and fluid will be permitted to escape into the annular groove 162. This fluid constitutes what has been referred to previously as the uncontrolled stream. It will be seen that the plunger 130 and the groove 162 act as a first set of cooperating valve elements for controlling the fluid pressure level in the chamber 144. Since it has been stated that $x$ is greater than $y$, it should be noted that the controlled stream is still free to pass without restriction from the annular groove 154 to the annular groove 160.

The fluid escaping into the annular groove 162 first passes into the passage 194, and then into passage 164, through the orifice 198 and the branch passage 196 to the chamber 188, through the passage 216 past the open poppet valve 220 into the chamber 214, and finally into the passage 156 to the port 158 and the return conduit 48. As soon as the flow velocity through the orifice 198 becomes sufficient to create a pressure drop, which, acting on the area of the pressure control plunger 134, creates a force equal to the force of the spring 190, the plunger 134 will move leftward. The leftward movement of the plunger 134 uncovers the right edge of the annular groove 200. The edge of the groove 200 may be designated as a first pressure control valve element cooperating with the end of the plunger 134 which may be designated as a first pressure control valve element cooperating with the end of the plunger 134 which may be designated a second pressure control valve element. The relative movement of the two valve elements permits the larger part of the uncontrolled stream to escape directly into the groove 200, and thence to the reservoir 14 via the passage 156, the port 158 and the return conduit 48.

The normal operating condition with the engine running and the vehicle either in motion or not in motion has now been described. It should be noted at this time that the pressure drops in the orifices 174 and 198 are in the nature of 20-30 psi, and, therefore, do not constitute a heavy load on the pumps; nor do they tend to cause undue heating of the oil. It should be understood that the pressure drop of the controlled stream flowing through the conduits 42, 44 and 48, and passing through the open center valving of the brake booster 40 and the steering gear 46 will equal or exceed the sum of the pressure drops in these orifices.

If the steering gear 46 is operated, it will, in the well understood manner, increase the pressure in the conduit 44. This increase in pressure is reflected all the way back to the pumps 10 and 12. The increase in pressure in the chamber 144 immediately increases the flow through the first set of cooperating valve elements constituted by the end of the plunger 130 and the edge of the groove 162, and decreases the flow through the orifice 174. The decrease in flow through the orifice 174 reduces the pressure drop and results in less pressure difference between the chambers 144 and 146. The plunger 130 therefor moves to the right, restricting the escape of fluid into the groove 162. This restores the flow through the orifice 174 while maintaining the new pressure level required by the steering gear 46.

If the brakes are applied by operation of the brake pedal 106, the following things happen more or less simultaneously. The brake switch 104 closes, applying power to the adaptive braking amplifier 100 so that it will respond if braking conditions require it. The pressure in conduit 42 is raised by the amount of pressure required by the booster, and, as a result, the flow control elements 130 and 162 of the control valve 28 respond initially in the same manner as when the steering gear 46 is operated. The booster cylinder pressure is transmitted from the port 50, through the conduit 54 to the port 52 of the control valve, and enters the chamber 212. If the brake booster pressure exceeds a predetermined value, such as 50 psi, the plunger 138 moves leftward against the force of the spring 222, seating the poppet 220 on its seat 218 and temporarily stopping the flow of a portion of the uncontrolled stream through the orifice 198. Stopping the flow through the orifice 198 results in equalizing the pressures in the chambers 186 and 188 acting on the ends of the plunger 134, and, therefore, the spring 190 moves the plunger 134 rightward, restricting the escape of fluid past the end of the plunger into the groove 200, and raising the pressure of the uncontrolled stream. When the pressure has increased to the level at which the brake pressure modulator 60 was designed to operate, e.g., 400 psi, the relief valve ball 206 is lifted from its seat against the force of the spring 208. This permits escape of fluid from the chamber 188, through the passage 202 to the annular groove 200, and thence to the reservoir, re-establishing flow through the orifice 198. The re-established flow through the orifice 198 again creates a pressure difference between the chambers 186 and 188. This pressure difference causes the plunger 134 to move so that the cooperating valve elements formed by the plunger 134 and the groove 200 adjust their relative positions to restrict the escape of the uncontrolled stream and maintain in the chamber 186 the same pressure as that established by the relief valve ball 206. Since the chamber 186 communicates with the passage 164 which, in turn, leads to the port 56 and the conduit 58 to the brake line pressure modulator 60, it will be understood that the modulator is now supplied with pressure fluid and is ready to respond to signals transmitted to it from the adaptive braking system amplifier 100. If no flow is required immediately, the uncontrolled stream will continue to escape to the reservoir through the pressure control elements of the control valve 28.

If the braking pressure developed in the conduit 42 by the brake booster 40 is greater than the pressure established by the pressure control elements, the flow control element operates in the same way as has just been described in connection with the operation of the steering gear 46. However, if the braking pressure established in the conduit 42 is less than the pressure established by the pressure control elements, the increase in pressure in the chamber 144 will tend to increase flow through the orifice 174 and thereby increase the volume of the controlled stream. The increased flow, however, causes an increased pressure drop in the orifice 174 which upsets the pressure balance between chambers 144 and 146, and the plunger 130 moves leftward until the right edge of the annular groove 154 approaches the left edge of the annular groove 160. These two edges constitute a second set of cooperating valve elements which act now to restrict the flow of the controlled stream downstream of the flow measuring orifice 174. A new condition of pressure balance is established with this second set of valve elements maintaining a restriction equal to the difference in pressure between the uncontrolled stream and the controlled stream. If the brake pressure is increased until it exceeds the pressure established in the uncontrolled stream by the pressure control elements 134 and 136, the flow control elements 130 and 132 will revert to the first described operational mode with the first set of valve elements providing the required restriction.

If braking conditions are such that any wheel of the vehicle approaches a locked condition, the amplifier 100 interprets the speed signals being transmitted by the wheel speed sensors 96 and transmits electrical signals through the wiring harness 108 to appropriate inlet and outlet solenoid valves 110 to 120 inclusive. These signals result in admission or escape of hydraulic fluid from the operation cylinders of the brake pressure modulators. This, in turn, controls the brake wheel cylinder pressures independently of the transmitted pressures in the lines 70 and 72 in the manner fully described in the above identified patents and patent applications.

When the brakes are released, pressure at the port 50 of the brake booster 40, in the conduit 54, and in the chamber 212 of the control valve 28 is reduced to reservoir pressure. The spring 222, assisted by the pressure in the passage 216 acting on the end of the poppet valve 220, moves the plunger 138 rightward to its normal position, re-establishing flow through the passage 216 to the chamber 214 and thence to the reservoir. This drops the pressure in the chamber 188 and causes the plunger 134 to move leftward and discharge the uncontrolled stream freely to the reservoir as previously described. Thus it will be seen that the pilot valve elements 134 and 136 function to render the pressure control elements 130 and 132 operative or inoperative in accordance with pressure signals received from an outside source such as the brake booster 40.

If either the brake booster 40 or the steering gear 46 is operated so as to block the flow of the controlled stream in the conduits 42 and 44, when the pressure exceeds a maximum safe level, such as e.g., 1,100 psi, the relief valve ball 180 raises from its seat and permits fluid to flow through the passage 176 to the reservoir by way of the annular groove 152, the passage 156, the port 158 and the return conduit 48. This flow causes a pressure drop in the orifice 168 positioned in the passage 166 resulting in a difference in pressure between the chambers 144 and 146 on opposite ends of the plunger 130. This pressure difference causes the plunger 130 to move leftward so that more fluid escapes into the annular groove 162 and thence to the reservoir. If the conduits 42 and 44 remain blocked, all of the fluid delivered by the pumps will be directed into the uncontrolled stream. Thus it will be seen that the control system of the invention also provides protection against excessive pressures.

The pumps are proportioned so that, if either is operating, the minimum needs of all systems will be met and thus the vehicle operator is protected against the effects of engine stalls, belt breakage, or internal failure of a pump, unless two such failures occur substantially simultaneously.

I claim:

1. A vehicle hydraulic system comprising:
   a hydraulic fluid reservoir;
   pump means receiving fluid from said reservoir and discharging pressurized fluid;
   valve means for receiving said discharged fluid from said pump means, said valve means having flow control means for dividing said discharged fluid into a controlled stream and an uncontrolled stream, and pressure control means operated by pilot means for regulating said uncontrolled stream to obtain additionally pressurized fluid;
   a power steering gear operated by said controlled stream;
   a brake booster operated by said controlled stream, said brake booster supplying pressure to said pilot means to operate said pressure control means; and
   an adaptive braking system having hydraulically operated brake pressure modulators that operate from said additionally pressurized fluid supplied by said pressure control means;
   said pressure control means returning unused portions of said uncontrolled stream to said reservoir.

2. The hydraulic system of claim 1 wherein said power steering gear and said brake booster are of the open center types.

3. The hydraulic system of claim 2 wherein said pump means comprises an engine driven pump and a drive shaft driven pump in a parallel relationship.

4. The hydraulic system of claim 3 wherein said valve means includes a check value in the outlet of each of said pumps.

5. A valve for use in a vehicle hydraulic system having pump means and reservoir means, comprising:
   a housing formed with port means for receiving a stream of fluid from said pump means;
   flow control means in the housing for receiving the stream of fluid from said pump means, said flow control means being constructed to divide the stream of flow into a controlled stream and an uncontrolled stream;
   pressure control means in said housing adapted to maintain a predetermined pressure on said uncontrolled stream; and
   pilot valve means in said housing for rendering said pressure control means inoperative; said pilot valve means being responsive to a pressure from an outside source.

6. The valve of claim 5 wherein said flow control means includes:
   A member formed with a flow metering orifice;
   A first set of cooperating valve elements positioned between the stream of fluid from said pump means and the uncontrolled stream; and
   A second set of cooperating valve elements positioned in the controlled stream downstream from said flow metering orifice.

7. The valve of claim 6 wherein said pump means comprises two pumps, said port means having at least two ports for receiving the streams of fluid from said pumps, said valve having check valve means positioned between said ports.

8. The valve of claim 5 wherein said pressure means comprises:
   a bore in said housing having closed ends forming two chambers, one of which receives the uncontrolled stream, said bore being formed with a first valve element for restricting said uncontrolled stream;
   a passage in said housing connecting said chambers, said passage having a restrictive orifice;
   a plunger in said bore separating the two chambers and formed with a second valve element cooperating with said first valve element for restricting said uncontrolled stream;
   spring means biasing said plunger toward its restricting position; and
   means for controlling the pressure in the other chamber.

9. The valve of claim 8 wherein said means for controlling the pressure in the other chamber comprises:
   a passage in said plunger which leads to said reservoir;
   a valve seat in said passage in said plunger;
   a ball resting on said valve seat; and
   spring means for exerting a predetermined load on said ball.

10. The valve of claim 8 wherein said pilot valve means comprises:
    a passage in said housing leading from said other chamber to said reservoir; and
    a poppet valve in said passage.

* * * * *